United States Patent [19]

Hummel et al.

[11] Patent Number: 4,809,829
[45] Date of Patent: Mar. 7, 1989

[54] VEHICULAR SHOCK ABSORBER AND PISTON COMFORT VALVING

[75] Inventors: Paul A. Hummel, St. Charles; James A. Skimerhorn, West Chicago, both of Ill.; Geoffrey Harris, Centerville, Ohio

[73] Assignee: Maremont Corporation, Carol Stream, Ill.

[21] Appl. No.: 225,613

[22] Filed: Jul. 26, 1988

Related U.S. Application Data

[63] Continuation of Ser. No. 132,640, Dec. 8, 1987, abandoned, which is a continuation of Ser. No. 948,405, Dec. 24, 1986, abandoned, which is a continuation of Ser. No. 715,096, Mar. 22, 1985, abandoned.

[51] Int. Cl.⁴ .............................................. F16F 9/34
[52] U.S. Cl. ................... 188/322.15; 188/282
[58] Field of Search ............. 188/280, 281, 282, 317, 188/322.13, 322.15, 322.32; 280/668

[56] References Cited

U.S. PATENT DOCUMENTS

| 396,889 | 1/1889 | Nickerson | 188/322.15 |
|---|---|---|---|
| 2,089,630 | 8/1937 | Teeter | 137/513.3 X |
| 2,327,295 | 8/1943 | Whisler | 188/280 |
| 2,944,638 | 7/1960 | Rossman | 188/280 |
| 3,007,550 | 11/1961 | Long | 188/322.15 X |
| 3,038,560 | 6/1962 | Long | 188/280 |
| 3,074,515 | 1/1963 | MacLellan | 188/280 |
| 3,931,830 | 1/1976 | Gritz | 137/513.3 X |
| 4,352,417 | 10/1982 | Stinson | 188/322.15 |
| 4,372,545 | 2/1983 | Federspiel | 188/282 X |
| 4,610,332 | 9/1986 | Mourray | 188/322.15 |
| 4,615,420 | 10/1986 | Mourray | 188/322.15 |

FOREIGN PATENT DOCUMENTS 2070730  9/1981  United Kingdom ........... 188/322.15

Primary Examiner—Duane A. Reger
Attorney, Agent, or Firm—McAndrews, Held & Malloy, Ltd.

[57] ABSTRACT

A vehicular MacPherson strut with piston comfort valving for accommodating short and rapid wheel movement on recoil only. A bypass valve disk is spring biased against a valve seat on a rebound chamber face of the piston head. The disk, seat and spring construction provides restricted flow followed by blow off on compression. On recoil, the disk provides bypass flow at stroke beginning, and flexes thereafter to stop bypass flow and restrict flow thereafter to restriction passages.

7 Claims, 1 Drawing Sheet

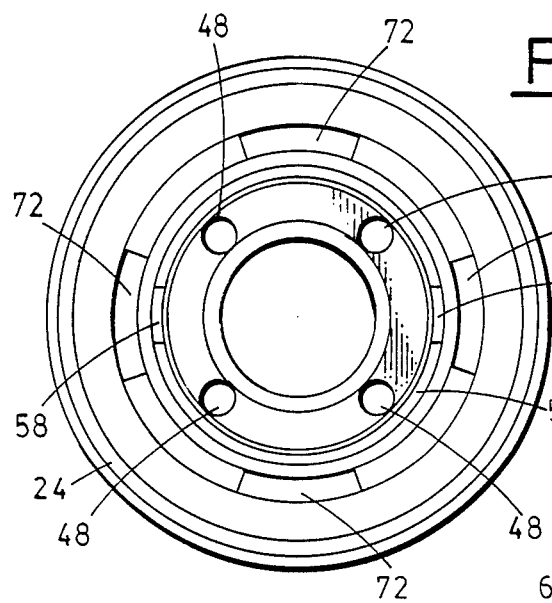
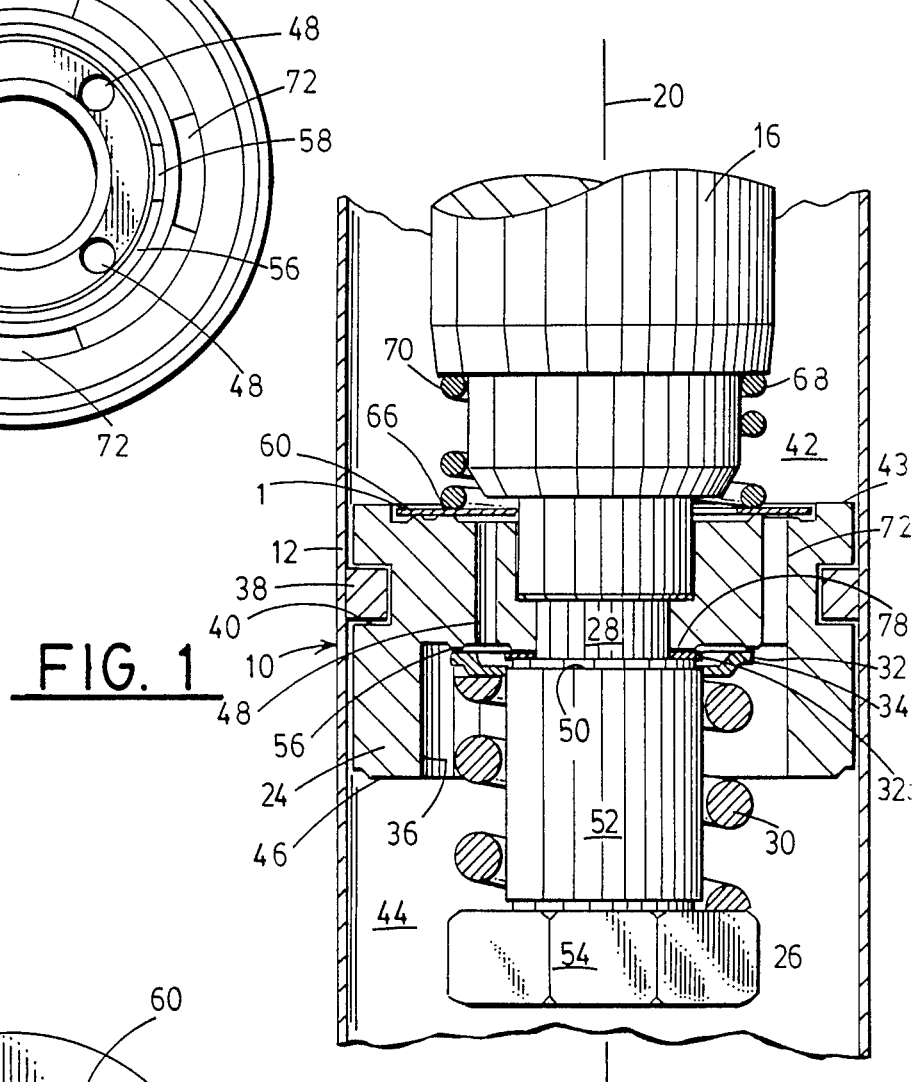
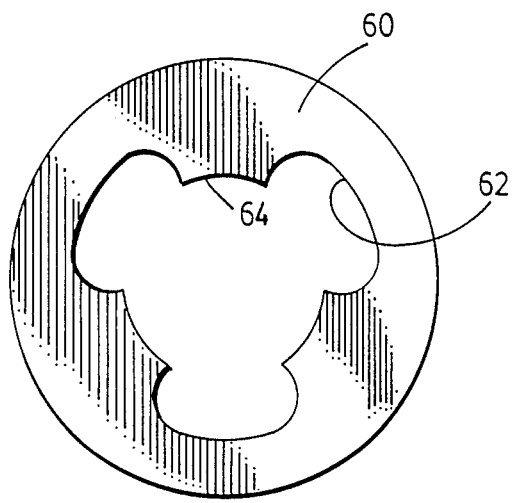
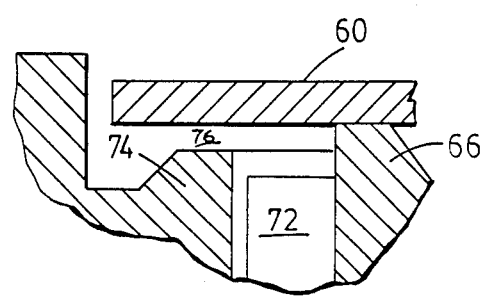

VEHICULAR SHOCK ABSORBER AND PISTON COMFORT VALVING

This application is a continuation of application Ser. No. 132,640, filed Dec. 8, 1987 now abandoned, which is a continuation of application Ser. No. 948,405, filed Dec. 24, 1986 which in turn, is a continuation of application Ser. No. 715,096 filed Mar. 22, 1985 now abandoned.

BACKGROUND OF THE INVENTION

This invention relates to vehicular shock absorbers, and to an improved piston valving assembly for MacPherson type struts and cartridges.

U.S. Pat. No. 4,356,898 discloses a desirable shock absorber. This shock is desirable because it has piston valving adapted to accommodate relatively short and rapid wheel movement without ride harshness, as well as relatively long and slow wheel movement. The first such wheel movements occur on tar strips and the like, while the second such movements occur at roadway intersection dips and the like. The effect of the valving is to reduce the damping forces at low piston velocities and short strokes without reducing the damping forces at high piston velocities at longer strokes. This in turn decreases ride harshness by reducing the forces that are transmitted by the shock absorber through the suspension system to the vehicle occupants during the aforementioned short wheel movements produced by tar strips and expansion joints. The damping forces at the beginning or initiation of long wheel excursions are also reduced. In the latter case, full damping forces at the higher velocities can still occur, but the rapid build up of those forces at the beginning of such wheel movement is reduced.

The valving of U.S. Pat. No. 4,356,898 is especially suited to twin tube shocks, which traditionally and exclusively have relatively small diameter piston rods. The valving is not suited to MacPherson type struts and cartridges with large diameter piston rods.

SUMMARY OF THE INVENTION

In a principal aspect, the present invention is improved piston valving in a vehicular shock absorber. At least one restriction passage and at least one bypass passage are in the piston extending from the compression chamber to the rebound chamber. A bypass valve means is on the piston for closing the bypass passage only during relatively long and slow piston movements on recoil and for opening the bypass passage during compression and during relative short and fast piston movements on recoil.

More specifically, the invention includes a piston head fastened to a piston rod. The piston head has a compression chamber face and a rebound chamber face. A plurality of the restriction and bypass passages extend between the faces. Along the inner and outer edges of the bypass passages, two raised bypass valve shoulders are formed. The inner shoulder is raised more than the outer shoulder. A flexible disk normally rests on the inner shoulder, allowing flow over the outer shoulder during short piston movement on recoil. The disk flexes to rest against the outer shoulder when the fluid pressure across the faces of the disc, during more rapid recoil movement of the piston, is sufficient to cause the disc to flex and thus close the bypass passages. The disk lifts during compression, against spring resistance, to open the bypass passages on compression, increasing the cross-sectional area of the fluid flow path.

The invention is especially suited to MacPherson type struts and cartridges, accommodating both short and rapid, and long and slow recoil movement.

These and other objects, aspects and advantages of the invention are more fully set forth in the detailed description of the preferred embodiment, which follows a brief description of the accompanying drawing.

BRIEF DESCRIPTION OF THE DRAWING

The accompanying drawing includes four figures or FIGS. as follows:

FIG. 1 is an elevational view of the shock absorber piston rod assembly and working cylinder which is the preferred embodiment of the invention partially cut away to reveal internal detail;

FIG. 2 is a detail view of the shock absorber piston valving in the area 1 of FIG. 1;

FIG. 3 is a compression face view of the piston body preferred shock absorber; and FIG. 4 is a plan view of the bypass valve disk of the preferred shock absorber.

DETAILED DESCRIPTION OF THE PREFERRED EMBODIMENT

Referring to FIG. 1, the preferred embodiment of the invention is shown as a piston assembly and working cylinder 10. An elongated hollow cylinder 12 is closed at a first end (not shown) and has a piston rod 16 extending through a seal (also not shown) at a second end. The elongated direction of the cylinder and rod is an axial direction 20.

The piston rod 16 is axially slidably movable in the cylinder 12, with a piston head 24 at its internal end. The head 24 is retained on the rod 16 by a retaining nut 26 screwed on a reduced diameter portion 28 of the rod. The nut 26 also holds a recoil spring 30, a recoil valve back-up disc 32a a valve plate 32 and a valve plate support 34 to the head 24, within a recessed portion 36 of the head.

The head 24 is annular and of one piece, machined or otherwise formed to the shape depicted. The exterior wall of the piston head is sized to within thousandths of an inch of the internal diameter of the cylinder 12. A seal 38 riding in a seal recess 40 seals across the piston head exterior wall and the cylinder interior wall.

Above the piston head 24, as the head is oriented in FIG. 1, the cylinder includes a variable volume rebound chamber 42. A face 43 of the head 24 defines a portion of the chamber wall, and is a rebound chamber face. Below the piston head 24, the cylinder includes a variable volume compression chamber 44. The head 24 has a compression chamber face 46. Both chambers 42, 44 are filled with hydraulic fluid.

The recoil valve plate 32 is mounted on the piston rod 16, and pinched between backup disc 32a and lower piston face 78. Valve plate 32, FIG. 1, is shown covering a plurality of restriction passages 48. During recoil movement of the piston, fluid pressure in chamber 42, communicated by passages 48 to the upper face of valve plate 32, overcomes the biasing effect of spring 30, causing disc 32a to deflect downward against the valve plate support 34 and thus opening restriction passages 48, providing fluid communication between chamber 42 and 44. Valve plate support 34 is slidably mounted on a sleeve 52 supported by nut 26. The recoil spring 30 is compressed between a nut cap 54 and the valve plate support 34. The spring 30 biases the valve plate support 34 and thereby the valve plate 32 to a position of closure of the restriction passages 48. The spring 30 yields to downward movement of the valve plate 32 due to a pressure differential across the piston head 24 during upward or recoil movement of the piston relative to the cylinder.

The restriction passages 48 extend through the piston head 24 from the rebound chamber face 43 to the compression chamber face 46. As shown in FIG. 3, the restriction passages 48 are sized in diameter to provide the desired hydraulic restriction. The passages 48 are at a single radial distance from the center of the piston head and spaced circumferentially about the piston head.

Adjacent the compression face opening of the restriction passages, a raised valve seat 56 can be segmented as shown to define a plurality of orifice slots 58. The outer periphery of the valve plate 32 contacts the valve seat 56 on compression, and before the spring 30 compresses on recoil. During such contact, hydraulic fluid flowing in the restriction passages flows through the orifice slots that were formed into the face of valve seat 56.

A bypass valve 60 is opposite the valve plate 32, across the piston head 24. The valve 60 is a flexible, flat annular disk, scalloped as shown in FIG. 4 to have oval recesses 62 about a circular interior opening 64. The recesses are spaced circumferentially equidistant about the disk 60.

The disk 60 is axially slidably mounted on the piston rod. The disk is slidable between a position of contacting an annular bypass valve seat 66 on the rebound chamber face, and being remote from the seat and face. In the position of contact, the disk 60 permits flow through the restriction passages to pass through the oval recesses 62. In the remote position, the disk 60 permits flow through the passages to pass both through the oval recesses 62, and between the disk 60 and valve seat 66. A bypass valve spring 68 biases the disk 60 to the contact position.

The spring 68 is compressed between the disk 60, opposite the seat 66, and a shoulder 70 on the piston rod. The spring 68 yields to upward movement of the disk 60. Such movement occurs upon a pressure differential across the piston head during compression movement of the head.

The valve seat 66 is a first of two bypass valve seats on the piston rebound face. As shown best in FIG. 2, the first bypass valve seat 66 is raised or projects axially from the piston rebound face, radially inwardly of a plurality of bypass slots 72. A second annular bypass valve seat 74 projects from the piston rebound face radially outwardly of the bypass slots 72. The outer seat 74 projects a lesser distance than the inner valve seat 66.

Referring again to FIG. 3, the slots 72 are arcuate in plan view of the piston head, and large relative to the restriction passages. The slots 72 are four in number, and are circumferentially, uniformly spaced about the piston head. The slots 72 are at a single or uniform radial distance from the piston center, and extend axially through the piston head from face to face. The slots 72 are radially outward of the restriction passages, raised valve seat 56 and valve plate 32.

The disk 60 extends radially outward of the slots 72 and the outer valve seat 74. In the radial distance between the inner valve seat 66 and the extreme outer edge, the disk 60 is solid or uninterrupted. With the disk 60 at rest against the inner seat 66, an annular gap 76 exists between the disk 60 and the outer seat 74. Fluid is free to flow through the gap 76 and slots 72.

The disk 60 is at least peripherally flexible for closing the gap 76. Flow through the gap 76 causes reduced static pressure in the gap 76. On recoil, the recoil movement causes increased pressure in the rebound chamber. The disk 60 responds to the pressure differential which results, by flexing into contact with the outer valve seat 74. This flexing action occurs only after the pressure differential has reached a predetermined magnitude which can be varied by changing the geometry of the disc and seat to provide optimum ride comfort. The gap 76 is closed only after a time which is delayed from the beginning of piston recoil movement.

As a result of this characteristic of fluctuating flexure, the disk 60 constitutes a type of bypass valve means for (a) opening the bypass passages on compression, (b) opening the bypass passages on recoil during relatively short piston strokes and during the initial motion or period of fast piston movement, and (c) closing the bypass passages on recoil during relatively long piston movement. The disk 60 keeps the bypass passages open on compression because of the higher pressure that is created in chamber 44 relative to the pressure in chamber 42 during compression. The bypass passages are open on recoil during relative short and fast piston movement, because the movement occurs before the disk closes.

The preferred embodiment of the invention is now described. This preferred embodiment constitutes the best mode contemplated by the inventors of carrying out the invention. The invention, and the manner and process of making and using it, have been described in full, clear, concise and exact terms to enable any person skilled in the art to make and use the same. Because the invention may be copied without the copying of the precise details of the preferred embodiment, the following claims particularly point out and distinctly claim the subject matter which the inventors regard as their invention and wish to protect.

What is claimed is:

1. A shock absorber comprising:

a cylinder;

a piston assembly including, a piston rod extending into the cylinder, and a piston head attached to the piston rod in the cylinder and dividing the cylinder into a compression chamber and a rebound chamber, the piston head defining at least one restriction passage between the compression chamber and the rebound chamber, and at least one bypass passage between the compression chamber and the rebound chamber; and a bypass valve means on the piston assembly, said bypass valve means including a bypass valve member means for fluctuating on recoil in response to pressure in the rebound chamber to close the bypass passage after an initial delay from the beginning of piston movement and (a) maintaining the bypass passages open on compression, (b) leaving open the bypass passages on recoil during the initiation only of long piston movements and during such short piston movements as caused by roadway tar strips and expansion joints, and (c) otherwise closing the bypass passages on recoil;

whereby the shock absorber reduces harshness during the beginnings of long wheel movements, and during short wheel movements as caused by tar strips and expansion joints.

2. A shock absorber as in claim 2 in which the bypass valve member means includes a bypass valve being located adjacent the bypass passage, and being flexible in structure to an extent sufficient to close the bypass passage during flexure.

3. A shock absorber as in claim 1 in which the piston head has a rebound chamber face, the rebound chamber face defines a bypass passage opening located at the bypass passage, the bypass valve is mounted to the piston adjacent the bypass passage opening, and the bypass valve closes the bypass passage by covering the bypass passage opening.

4. A shock absorber as in claim 3 in which the bypass valve is a flexible disk.

5. A shock absorber as in claim 1 in which,
the piston head has a rebound chamber face;
the rebound chamber face defines a bypass passage opening located at the bypass passage;
the piston head includes at least one raised valve seat adjacent the bypass passage opening; and
the bypass valve means includes a bypass valve disk mounted on the piston rod, being in contact with the raised valve seat in a rest position while the piston assembly is stationary relative to the cylinder, and being flexible in structure to an extent sufficient to close the bypass passage on recoil by flexing to cover the bypass passage opening in response to a pressure difference across the disk caused by increase pressure in the rebound chamber and decreased pressure at the bypass passage opening, which pressure difference occurs after an initial time delay from the beginning of piston movement.

6. A shock absorber as in claim 1 in which,
the piston head has a rebound chamber face partially defining the rebound chamber;
the rebound chamber face defines a plurality of bypass openings and a plurality of restriction passages, the bypass openings being substantially axially extending and spaced circumferentially about the piston head at substantially equal radii;
the piston head includes a first, annular valve seat about the rebound chamber face extending radially inwardly adjacent each of the plurality of bypass openings, and a second, annular valve seat about the rebound chamber face extending radially outwardly adjacent each of the plurality of bypass openings, the first valve seat being raised beyond the second valve seat; and
the bypass valve means includes an annular bypass valve disk slidably mounted on the piston rod adjacent the rebound chamber face, the bypass valve disk being slidable into contact with the first valve seat and flexible into contact with the second valve seat.

7. A shock absorber as in claim 6 further comprising biasing means on the piston assembly for (a) biasing the valve disk into contact with the first valve seat and (b) yielding to movement of the valve disk from the first valve seat on compression.

* * * * *